(12) United States Patent
Montminy et al.

(10) Patent No.: US 9,774,869 B2
(45) Date of Patent: Sep. 26, 2017

(54) RESILIENT SIGNAL ENCODING

(71) Applicants: QNX Software Systems Limited, Kanata (CA); Research In Motion Limited, Waterloo (CA)

(72) Inventors: Christian Joseph Montminy, Ottawa (CA); Gaëlle Christine Martin-Cocher, Toronto (CA); Dake He, Waterloo (CA)

(73) Assignees: BlackBerry Limited, Waterloo, Ontario (CA); Ontario Inc., Waterloo, Ontario (CA)

( * ) Notice: Subject to any disclaimer, the term of this patent is extended or adjusted under 35 U.S.C. 154(b) by 557 days.

(21) Appl. No.: 13/849,983

(22) Filed: Mar. 25, 2013

(65) Prior Publication Data
US 2014/0286407 A1 Sep. 25, 2014

(51) Int. Cl.
*H04N 19/172* (2014.01)
*H04N 19/164* (2014.01)
*H04N 19/105* (2014.01)

(52) U.S. Cl.
CPC ......... *H04N 19/172* (2014.11); *H04N 19/105* (2014.11); *H04N 19/164* (2014.11)

(58) Field of Classification Search
CPC .. H04N 19/164; H04N 19/172; H04N 19/105; H04N 19/159; H04N 19/177;
(Continued)

(56) References Cited

U.S. PATENT DOCUMENTS

| 6,169,821 B1 * | 1/2001 | Fukunaga | H04N 21/4382 375/E7.016 |
| 6,487,316 B1 * | 11/2002 | Fukunaga | H04N 21/4382 375/E7.016 |

(Continued)

FOREIGN PATENT DOCUMENTS

| EP | 0 763 944 A2 | 3/1997 | |
| JP | EP0763944 A2 * | 3/1997 | H04N 7/50 |
| JP | EP1238539 B1 * | 12/2010 | H04N 7/26 |

OTHER PUBLICATIONS

"Error resilient video coding controlled by backward channel signaling" by Shigeru Fukunaga et al., Image Communication 14 (1999) 531-540.*

(Continued)

*Primary Examiner* — Dramos I Kalapodas
(74) *Attorney, Agent, or Firm* — Brinks Gilson & Lione

(57) ABSTRACT

A system and method for resilient signal encoding provide for encoding a data signal to reduce bandwidth required to transmit the encoded signal while mitigating the impact of frames lost or corrupted during transmission. A first frame of the data signal is encoded as an independently decodable frame and is assigned as a reference frame. Subsequent frames of the data signal are encoded as different frames relative to the reference frame. The independently decodable frame and the difference frames are transmitted to a receiver. The receiver decodes the frames and sends an acknowledgement for one or more successfully decoded difference frames. When an acknowledgment is received, a corresponding data signal frame is assigned as the reference frame. Subsequent difference frames are encoded relative to the newly assigned reference frame.

28 Claims, 3 Drawing Sheets

(58) Field of Classification Search
CPC ............... H04N 19/114; H04N 21/643; H04N 19/00018; H04N 7/26; H04N 7/32; H04N 7/50; H04N 19/00236; H04N 19/463; H04N 19/65; H04N 19/51; H04N 19/176; H04N 19/66; H04N 19/67; H04N 19/58; H04N 19/587; H04N 19/61; H04N 19/132; H04N 19/573; H04N 19/89; H04N 19/577; H04N 19/31; H04N 19/166; H04N 19/37; H04N 19/107; H04N 19/162; H04N 21/43853; H04N 21/4425; H04N 21/6583; H04N 21/4382; H04N 21/658; H04L 29/08; H04L 1/0014; H04L 1/1607; H04L 1/1809; H04B 1/66

See application file for complete search history.

(56) References Cited

U.S. PATENT DOCUMENTS

| | | | | |
|---|---|---|---|---|
| 6,621,868 B1* | 9/2003 | Kimata | ............... | H04N 21/6377 375/240.27 |
| 7,450,640 B2* | 11/2008 | Kim | ............... | H04N 19/105 375/240.12 |
| 7,496,044 B1* | 2/2009 | Wing | ............... | H04L 29/06027 370/242 |
| 7,743,141 B2* | 6/2010 | Wang et al. | ............... | 709/224 |
| 8,010,652 B2* | 8/2011 | Wang et al. | ............... | 709/224 |
| 8,325,639 B2* | 12/2012 | Kotera | ............... | H04L 12/66 370/311 |
| 8,718,137 B2* | 5/2014 | Eleftheriadis et al. | .. | 375/240.12 |
| 8,804,848 B2* | 8/2014 | Cipolli | ............... | H04L 1/1607 375/240.27 |
| 8,848,779 B2* | 9/2014 | Segall | ............... | H04N 7/26755 375/240 |
| 9,077,964 B2* | 7/2015 | Cipolli | ............... | H04L 1/1607 |
| 9,306,708 B2* | 4/2016 | Lu | ............... | H04L 1/1671 |
| 2006/0256867 A1* | 11/2006 | Turaga | ............... | H04N 19/39 375/240.16 |
| 2007/0213038 A1* | 9/2007 | Masseroni | ............ | H04L 29/06027 455/414.3 |
| 2008/0247463 A1* | 10/2008 | Buttimer et al. | ........ | 375/240.12 |
| 2009/0251528 A1* | 10/2009 | Friel et al. | ................. | 348/14.08 |
| 2010/0118943 A1* | 5/2010 | Shiodera | ............ | H04N 19/105 375/240.12 |
| 2012/0287986 A1* | 11/2012 | Paniconi | ............. | H04N 19/115 375/240.02 |
| 2013/0058409 A1* | 3/2013 | Kadono | ............... | H04N 19/105 375/240.12 |
| 2013/0202025 A1* | 8/2013 | Baron et al. | ............. | 375/240.02 |
| 2013/0279606 A1* | 10/2013 | Vanam et al. | ............ | 375/240.27 |

OTHER PUBLICATIONS

"Error resilient video coding controlled by backward channel signaling"; 0923-5965 © 1999, Elsevier Science, to Yasuko Matsumura and Shigeru Fukunaga et al.*

"Adaptive Dly-ACK for TCP over 802.15.3 WPAN", Hongyuan Chen, © 2004 IEEE.*

European Search Report for corresponding European Application EP 13 16 0824.2, dated Aug. 23, 2013, pp. 1-9.

Chen, Hongyuan et al., "Adaptive Dly-ACK for TCP over 802.15.3 WPAN," *IEEE Communications Society, Global Telecommunications Conference*, vol. 3 (Nov. 29, 2004) pp. 1686-1690, U.S.

Nakai, Toshihisa et al., "Error Resilient Video Coding using Backward Channel Signaling," ISO/IEC JTC1/SC29/WG11, (Feb. 1997) pp. 1-12, U.S.

\* cited by examiner

RESILIENT SIGNAL ENCODING

BACKGROUND

1. Technical Field

The present disclosure relates to the field of encoding digital signals to reduce bandwidth utilization. In particular, to a system and method for resilient signal encoding.

2. Related Art

A digital signal that is composed of successive frames of information (a.k.a. data) may be encoded using various mechanisms in order to reduce the bandwidth required to transmit the signal. One such mechanism is inter-frame encoding where in some frames may be encoded as independently decodable frames (a.k.a. i-frames) while the remaining frames each may be encoded relative to an independently decodable frame as difference frames (p-frames) or relative to another p-frame. The mechanism is susceptible to some p-frames becoming undecodable when the frame relative to which they were encoded is lost or corrupted in transmission. Some mechanisms (e.g. Internet Engineering Task Force (IETF) Extended RTP Profile for Real-time Transport Control Protocol (RTCP)-Based Feedback (RTP/AVPF) RFC 4585) are used whereby a receiver of the encoded frames may inform the encoder of the frames when some received frames are undecodable.

Typically a trade-off is made between resilience to frame loss or corruption and a degree of bandwidth utilization (i.e. compression) in either or both of a downlink channel and an uplink channel.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for resilient signal encoding is described herein. The system and method provide for encoding a digital signal to reduce bandwidth required to transmit the encoded signal while mitigating the impact of frames lost or corrupted during transmission. The system and method may be used in applications such as, for example, video conferencing, telepresence, streaming media, video editing and other similar applications.

Figure 1:
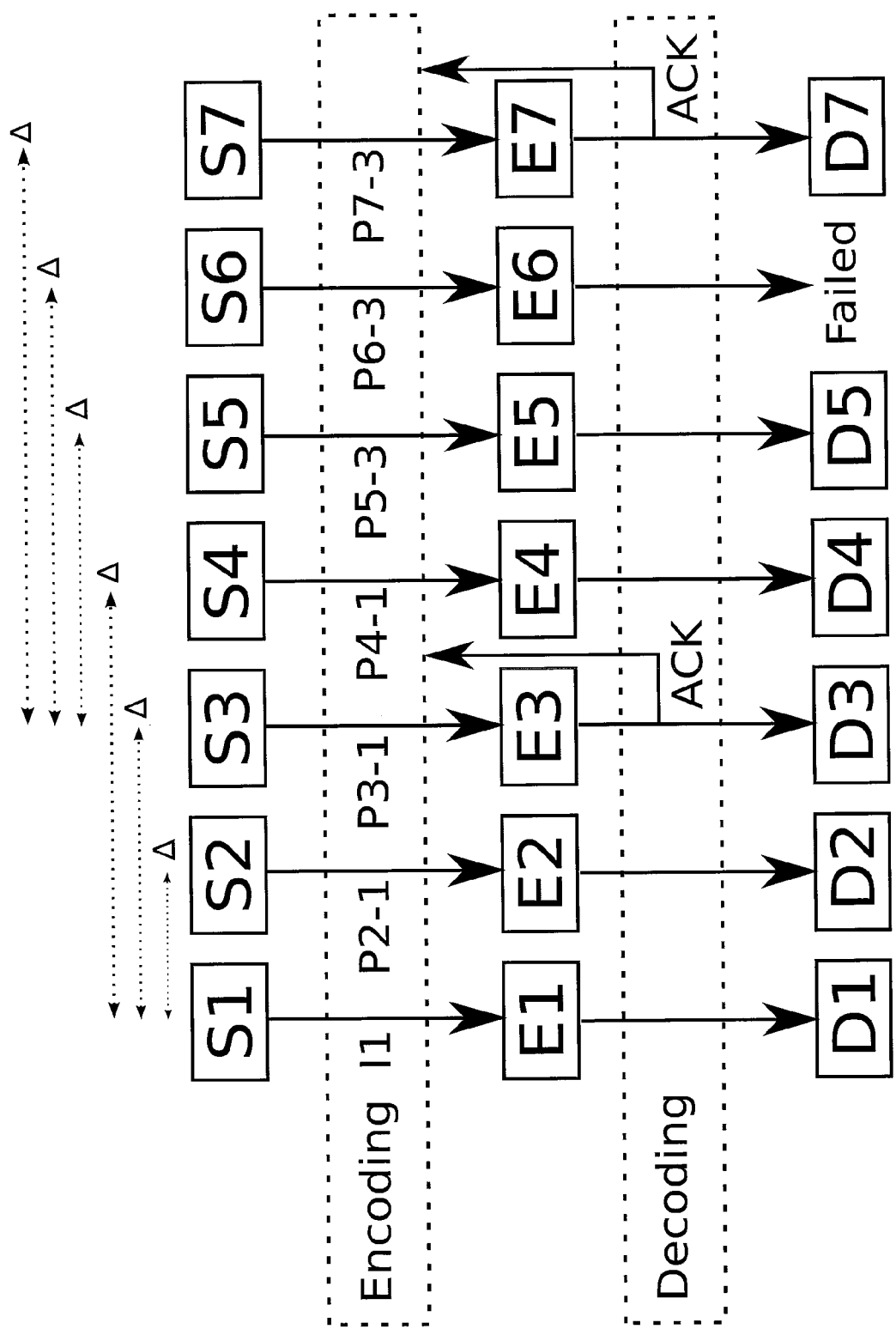
FIG. 1 is a schematic representation of a time series of encoded frames of a digital signal.

FIG. 1 is a schematic representation of a time series of encoded frames of an encoded signal. The encoded signal is derived from an input signal in accordance with the system and method for resilient signal encoding. The input signal may be a digital signal that comprises a sequence of data samples (e.g. frames) that represent, for example, a video stream or other similar content. For illustrative purposes the input signal describes herein represents a video stream comprising a sequence of video frames S1-S7 but the illustration is not intended to be limiting in any way. In FIG. 1 time is represented in the horizontal axis progressing from left (earlier time) to right (later time).

A first frame of the input signal S1 may be encoded as an independently decodable frame (I1) and placed in the encoded signal as encoded frame E1. The independently decodable frame E1 may be transmitted to a receiver for decoding. The receiver may decode the independently decodable frame without reference to any other frames in the encoded signal as decoded frame D1. A subsequent frame of the input signal S2 may be encoded as a difference frame (P2-1) that represents a content difference between the first frame S1 and the subsequent frame S2. The first frame acts as a reference frame for the encoding of the subsequent frame. The difference frame E2 may be transmitted to the receiver for decoding. The receiver may decode the difference frame E2 by referencing the independently decodable frame E1. The independently decodable frame E1, which corresponds to the first frame S1, acts as a reference frame for the decoding of the difference frame E2. Further frames of the input signal S3 and S4 may be encoded as difference frames E3 and E4 in a manner similar to that described above with reference to the subsequent frame S2.

When the receiver successfully decodes a difference frame, the receiver may send an acknowledgement (ACK) indicating that the difference frame was successfully decoded. In response to receiving the acknowledgement (ACK), the frame associated with acknowledgement S3 may be assigned as the reference frame and further subsequent frames of the input signal S5, S6 and S7 may be encoded as difference frames E5, E6 and E7 that represent a content difference between the frame S5, S6 and S7 and the reference frame S3. The receiver may send an acknowledgement for each difference frame that is successfully decoded. Alternatively the receiver may only send an acknowledgement for difference frames that are marked as acknowledgement-requested and that have been successfully decoded. During encoding some difference frames such as, for example, every $N^{th}$ frame may be marked as acknowledgement-requested before they are transmitted. Difference frames that are marked as acknowledgement-requested may be candidate reference frames. The interval N for marking candidate reference frames may be a number between 2 and a predetermined upper limit (e.g. 3000) that may be preconfigured or may be user specified. In a further alternative, a difference frame may be marked as acknowledgement-requested (e.g. a candidate reference frame) based on the content of the frame and/or one or more frames occurring before or after the frame, for example, to minimize the difference between the reference frame and subsequently encoded frames. In another alternative, frames designated as golden frames (e.g. as specified in Internet Engineering Task Force (IETF) RFC 6386, VP8 Data Format and Decoding Guide) may be marked as acknowledgement-requested. In the example illustrated in FIG. 1, encoded frame E3 was successfully decoded and an acknowledgement was sent. Subsequently, frames S5, S6 and S7 are encoded as difference frames E5, E6 and E7 relative to S3 that corresponds to frame E3 associated with the sent acknowledgement.

Alternatively, or in addition, the receiver may send an acknowledgement whether or not a difference frame was successfully decoded. The acknowledgement may include a binary variable, flag or other similar indicator that has one value or state to signify successful decoding and another value or state to signify a failure to successfully decode the difference frame. The acknowledgement may further include one or more indicators of the outcomes (e.g. success or failure) of decoding earlier frames. For example, the acknowledgement may also include indicators of the outcomes of decoding of K previous frames. The number of previous frames K may be a number (e.g. 7, 15, 23 or 31) that may be preconfigured or may be user specified. The acknowledgement may take the form of a binary bit mask in which a first bit represents the outcome of decoding a current frame and K further bits represent the outcome of decoding K previous frames. In a further alternative, the indicator of the outcome of decoding each frames may assigned to a class where the class specifies the number of times (e.g. 32, 16, 8 or 0) that the indicator will be repeated (e.g. included in an acknowledgement). The inclusion of an indicator of the outcome of decoding previous frames may be limited to previous frames that are candidate reference frames (e.g. frames that are mark acknowledgement-requested). The redundant inclusion of indicators of the outcome of decoding one or more previous frames in the acknowledgement allows the system and method to be resilient when one or more acknowledgements are lost during transmission. An indicator that fails to be returned a first lost acknowledgement may be successfully returned in a subsequent acknowledgement.

A failure to successfully decode frame E6 is shown resulting in no acknowledgement being sent for E6. Encoded frame E7 is successfully decoded despite the failure to decode E6 because E3 was successfully decoded to D3 and E7 was encoded relative to S3. Due to the failure to decode E6, no acknowledgement was sent but the system and method may receive an acknowledgement of the successful decoding of E7 instead. Difference frame E7 may, for example, be marked as acknowledgement-requested when no acknowledgement is received for E6. Subsequently encoded frames may be encoded relative to S7. Alternatively, when no acknowledgement is received for E6 subsequent frames may continue to be encoded relative to the current reference frame S3 until an acknowledgement is received for a subsequent candidate reference frame, for example the next $N^{th}$ frame.

In the illustrated example of FIG. 1, S4 is encoded relative to S1 even though acknowledgement was sent for E3. After an acknowledge is sent, encoding of subsequent frames may continue to use a previous reference frame for some time due to various factors including propagation delay, caching, pipelining and other similar latency related factors.

Alternatively, or in addition, encoding may operate in one of two possible modes: normal mode and safe mode. Selection of one of the two modes may be responsive to feedback from the receiver (e.g. acknowledgements received). In safe mode encoding only uses as a reference frame a frame for which an acknowledgement, including a positive indication of successfully decoding, has been received. In normal mode encoding may use as a reference frame any frame including a frame for which no acknowledgement including a positive indication of successfully decoding has been received. Encoding may switch from normal mode to safe mode when, for example, an acknowledgement is received that includes an indicator of unsuccessful decoding of a frame. Encoding may switch from safe mode to normal mode when an abatement criterion is met. The abatement criterion may include, for example, when a positive indication of successfully decoding has been received for L success frames, where L is a number that may be preconfigured or may be user specified. Alternatively, the abatement criterion may specify a minimum time duration during which encoding remains in safe mode to mitigate frequent switching between safe and normal mode. Encoding may be configured to start either in normal mode or safe mode.

The independently decodable frame and each of the difference frames is uniquely identifiable using, for example, sequence numbers that may be included in the encoded frames. Each difference frame may also include identification of the reference frame from which it was encoded and that may be used to decode the difference frame. Each acknowledgement sent by the receiver may identify the frame that was successfully decoded using, for example, the sequence number of the frame.

The system and method may encode and transmit only a single independently decodable frame thereby mitigating the bandwidth required to transmit the encoded signal. Further independently decodable frames may be encoded and transmitted at any time responsive to input such as, for example, a force reset request or detection of the loss or failure to decode a previous independently decodable frame. When the receiver successfully decodes an independently decodable frame, the receiver may send an acknowledgement (ACK) indicating that the independently decodable frame was successfully decoded. In the absence of receiving an acknowledgement, a further independently decodable frame may be encoded and transmitted to the receiver.

The system and method for resilient signal encoding may use various forms of inter-frame compression either lossy or lossless. The inter-frame compression may be used in combination with other compression techniques (e.g. predictive encoding). The system and method for resilient signal encoding may use encoding formats such as, for example, International Telecommunication Union-Telecommunication Standardization Sector (ITU-T) Advanced Video Coding For Generic Audiovisual Services (AVC)/H.264 or High Efficiency Video Coding (HEVC)/H.265 including scalable and multiview extensions of these formats such as scalable video coding (SVC), multiview video coding (MVC), 3-dimensional coding (3D), and The WebM Project VP8 or VP9 coding.

The acknowledgements may be received using in-band signaling in accordance with a video codec syntax being used for the encoded frames (e.g. H.264), as part of an ITU-T Supplementary Enhancement Information (SEI) message, or using a user data extension mechanism. Alternatively or in addition, the acknowledgements may be sent out-of-band using mechanisms such as, for example, as part of an IETF Session Initiation Protocol (SIP) message, as part of a Moving Picture Expert Group (MPEG) green MPEG set of metadata dedicated to resource saving, as part of an IETF Real Time Communication Web (RTCWeb) mechanism, as part of an IETF codec control message or as part of an IETF Audio-Visual Profile with Feedback (AVPF) message.

The acknowledgement-requested marking of a frame may be sent as a flag or as a syntax element using in-band signaling in accordance with a video codec syntax being used for the encoded frames (e.g. H.264), as part of an ITU-T SEI message or using a user data extension mechanism. Alternatively, or in addition, the acknowledgement-requested marking of a frame my be sent out-of-band using mechanisms such as, for example, as part of a MPEG green MPEG set of metadata dedicated to resource saving, as part of an IETF RTCWeb mechanism or as part of an IETF SIP message.

Figure 2:
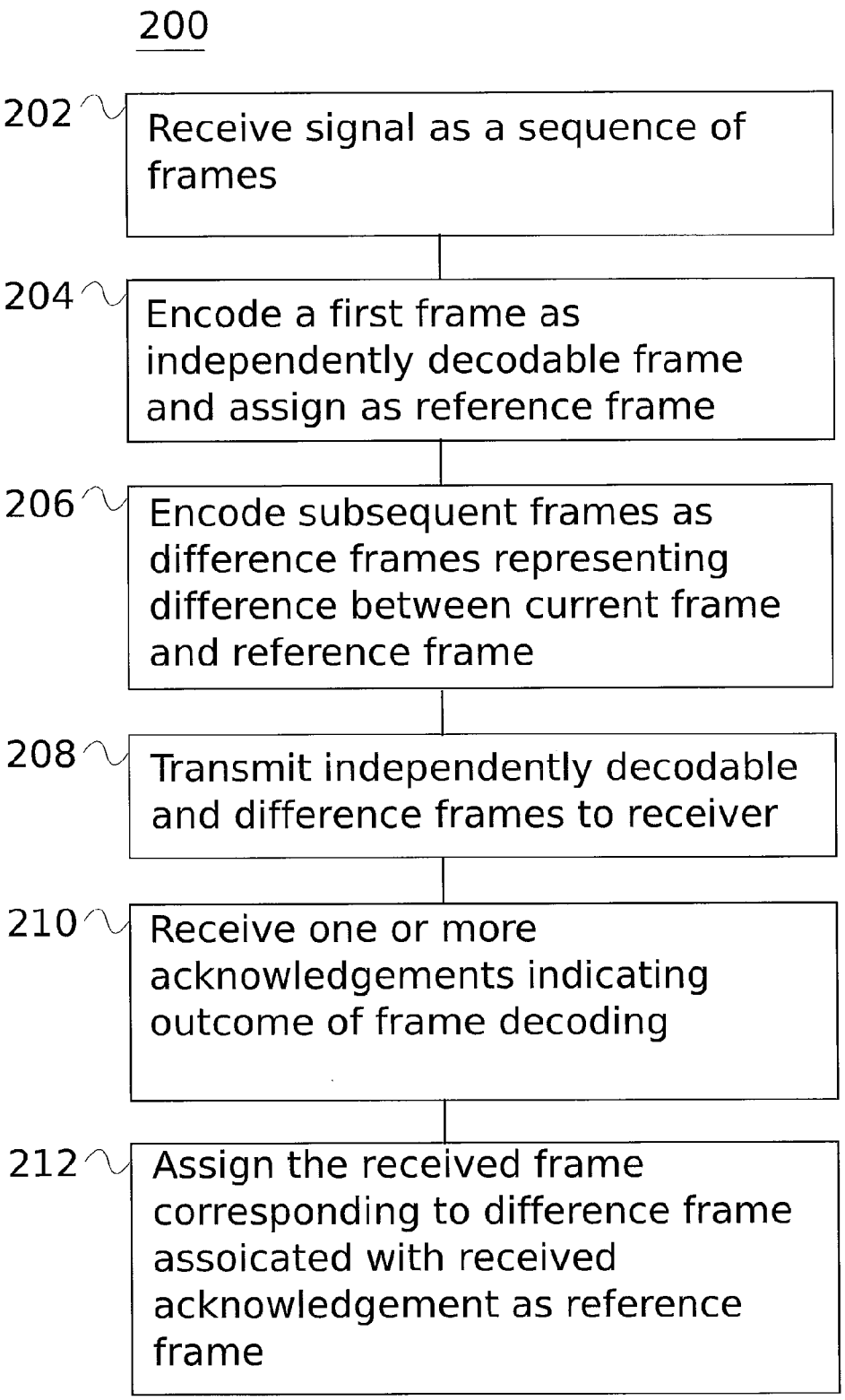
FIG. 2 is a schematic representation of a method for resilient signal encoding.

FIG. 2 is a representation of a method for resilient signal encoding. The method 200 may, for example, be implemented using the system 300 described herein with reference to FIG. 3. The method 200 includes the following acts. Receiving a signal as a sequence of frames 202. Encoding a first frame, of the received frames, as an independently decodable frame (a.k.a. an i-frame) and assigning or designating the first frame as a reference frame 204. Encoding subsequent frames, of the received signal, as difference frames (a.k.a. p-frames) representing a difference between a current frame, of the subsequent frames, and the reference frame 206. Transmitting the independently decodable frame and the difference frames, as they are encoded, to a receiver 208. Receiving one or more acknowledgements (a.k.a. ACK) each indicating the outcome of frame decoding 210. An acknowledgement may be sent by the receiver when an independently decodable frame or a difference frame has been successfully decoded. An acknowledgement may be sent by the receiver when a golden frame has been successfully decoded. The receiver may only send an acknowledgement for difference frames that are marked as acknowledgement-requested. The acknowledgement may further include one or more indicators of the outcomes (e.g. success or failure) of decoding earlier frames. For example, the acknowledgement may also include indicators of the outcomes of decoding of K previous frames. Assigning or designating the received frame corresponding to a difference frame associated with a received acknowledgement as the reference frame 212. Subsequently encoded difference frames as described in act 206 may represent a difference between the current frame and the newly assigned reference frame. In an alternative embodiment, the method may further include switching between a safe mode according to act 212 described above and a normal mode where encoding may use as a reference frame any frame including a frame for which no acknowledgement including a positive indication of successfully decoding has been received.

Figure 3:
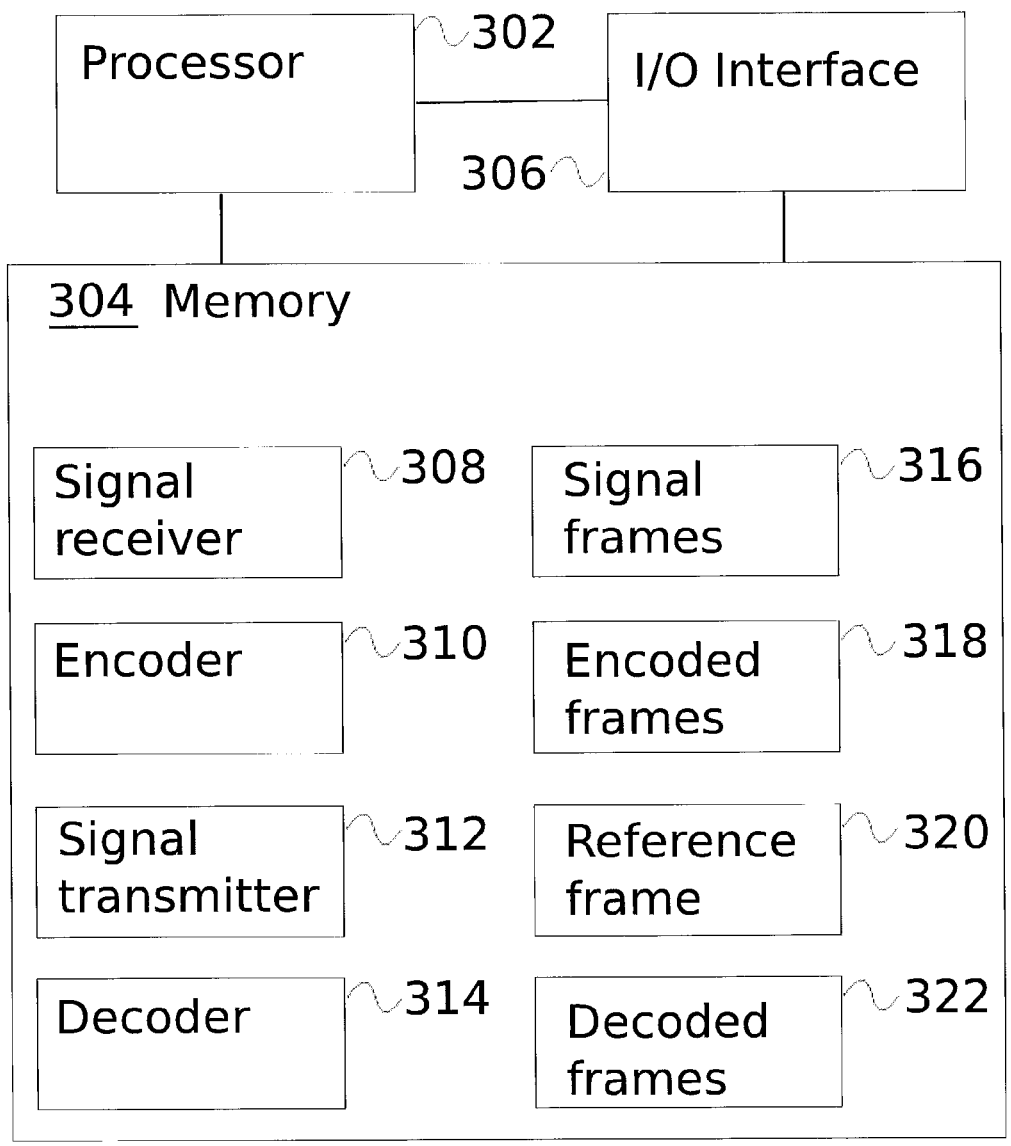
FIG. 3 is a schematic representation of system for resilient signal encoding.

FIG. 3 is a schematic representation of a system for resilient signal encoding 300. The system 300 comprises a processor 302, memory 304 (the contents of which are accessible by the processor 302) and an I/O interface 306. The memory 304 may store instructions which when executed using the process 302 may cause the system 300 to render the functionality associated with a signal receiver 308, an encoder 310, a signal transmitter 312 and a decoder 314. Alternatively, or in addition, the instructions when executed using the process 302 may configure the system 300 to implement the acts of method 200. In addition the memory 304 may store information in data structures including, for example, signal frames 316, encoded frames 318, reference frame 320, decoded frames 322 and golden frames.

The processor 302 may comprise a single processor or multiple processors that may be disposed on a single chip, on multiple devices or distributed over more that one system. The processor 302 may be hardware that executes computer executable instructions or computer code embodied in the memory 304 or in other memory to perform one or more features of the system. The processor 302 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 304 may comprise a device for storing and retrieving data, processor executable instructions, or any combination thereof. The memory 304 may include non-volatile and/or volatile memory, such as a random access memory (RAM), a read-only memory (ROM), an erasable programmable read-only memory (EPROM), or a flash memory. The memory 304 may comprise a single device or multiple devices that may be disposed on one or more dedicated memory devices or on a processor or other similar device. Alternatively or in addition, the memory 304 may include an optical, magnetic (hard-drive) or any other form of data storage device.

The memory 304 may store computer code, such as signal receiver 308, encoder 310, signal transmitter 312 and decoder 314 as described herein. The computer code may include instructions executable with the processor 302. The computer code may be written in any computer language, such as C, C++, assembly language, channel program code, and/or any combination of computer languages. The signal receiver 308 may receive a signal as a sequence of frames. The encoder 310 may encode a first frame, of the received frames, as an independently decodable frame and assign the first frame as a reference frame. The encoder 310 may encode subsequent frames, of the received signal, as difference frames representing a difference between a current frame, of the subsequent frames, and the reference frame. The signal transmitter 312 may transmit the independently decodable frame and the difference frames, as they are encoded, to a receiver. The signal receiver 308 may also receive acknowledgements associated with successfully decoded frames. When an acknowledgement is received, the received frame corresponding to the difference frame associated with a received acknowledgement may be assigned as the reference frame. Subsequently encoded frames of the received frames may be encoded relative to the newly assigned reference frame by the encoder 310. The system 300 may not include the decoder 314 when an encoded signal is only transmitted to the receiver (e.g. in one-way transmission). When encoded signals are transmitted to the receiver and also received by the system (e.g. in two-way transmission) the system 300 may include the decoder 314. The decoder 314 decodes the received encoded frames and when a frame is successfully decoded, the decoder 314 may send an acknowledgement to the transmitter of the encoded frames. The receiver may only send an acknowledgement for difference frames that are marked as acknowledgement-requested.

The I/O interface 306 may be used to connect devices such as, for example, data transmission media and other components of the system 300.

All of the disclosure, regardless of the particular implementation described, is exemplary in nature, rather than limiting. The system 300 may include more, fewer, or different components than illustrated in FIG. 3. Furthermore, each one of the components of system 300 may include more, fewer, or different elements than is illustrated in FIG. 3. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for on-demand user control have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method of encoding a signal comprising:
   receiving, over time, a sequence of input frames that comprise the signal;
   encoding a first frame of the sequence of input frames as an independently decodable frame and assigning the first frame as a current reference frame;
   encoding subsequently received input frames, in the sequence of input frames, each as a difference frame that represents a difference between the input frame and the current reference frame;
   transmitting the independently decodable frame and each of the difference frames, after each is encoded, to a receiver;
   receiving one or more acknowledgements from the receiver;
   assigning an input frame corresponding to a difference frame associated with a received acknowledgment, of the one or more acknowledgements, as the current reference frame;
   switching to a safe operating mode when one or more acknowledgements indicate that one of the independently decodable frame or the difference frames was unsuccessfully decoded; and
   switching to a normal operating mode when an abatement criterion is met;
   where the one or more acknowledgements are received through an in-band or an out-of-band signaling.

2. The method of encoding a signal of claim 1, where the signal includes a video stream.

3. The method for encoding a signal of claim 1, where the received one or more acknowledgements includes one or more indicators each signifying an outcome of a decoding of an associated difference frame.

4. The method for encoding a signal of claim 1, where the receiver decodes each difference frame using a frame previously decoded by the receiver that corresponds to the current reference frame from which the difference frame was derived without referencing any intervening frames in the sequence of frames between the current reference frame and the difference frame.

5. The method for encoding a signal of claim 1, where each of the one or more acknowledgements is associated with one or more difference frames that are each marked as an acknowledgment-requested.

6. The method for encoding a signal of claim 5, where each N difference frame is marked as the acknowledgment-requested before being transmitted and where N is a predetermined value.

7. The method for encoding a signal of claim 5, where the acknowledgment-requested mark for each of the one or more difference frames is sent in-band using mechanisms including any of: in accordance with a video codec syntax being used for the encoding the input frames, in accordance with an ITU-T Supplementary Enhancement Information (SEI) message, and using a user data extension mechanism.

8. The method for encoding a signal of claim 5, where the acknowledgment-requested mark for each of the one or more difference frames is sent out-of-band using mechanisms including any of: a Moving Picture Expert Group (MPEG) green MPEG set of metadata, an IETF RTCweb mechanism and an IETF Session Initiation Protocol (SIP) message.

9. The method for encoding a signal of claim 1, where the independently decodable frame and each difference frame are encoded in accordance with an ITU-T Video Coding Experts Group H.264 standard.

10. The method for encoding a signal of claim 1, where the one or more acknowledgements are received in-band using mechanisms in accordance with: a video codec syntax, a ITU-T Supplementary Enhancement Information (SEI) message, or a user data extension mechanism.

11. The method for encoding a signal of claim 1, where the one or more acknowledgements are received out-of-band using mechanisms including any of: an IETF RTCweb mechanism, an IETF codec control message, an IETF AVPF message, a Moving Picture Expert Group (MPEG) green MPEG set of metadata, IETF codec control message and a IETF Session Initiation Protocol (SIP) message.

12. The method for encoding a signal of claim 1, further comprising:
    when in a safe mode, assigning an input frame corresponding to a difference frame associated with a received acknowledgment, of the one or more acknowledgements, as the current reference frame; and
    when in a normal mode, assigning an input frame as the current reference frame regardless of receiving an acknowledgement associated with a difference frame corresponding to the input frame.

13. The method for encoding a signal of claim 12, where the abatement criterion comprises receiving a positive indication of successful decoding of a predetermined number of successive independently decodable frame or the difference frames.

14. The method for encoding a signal of claim 12, where the abatement criterion comprises a predetermined time duration of operation in the safe operating mode.

15. A non-transitory machine readable medium encoded with machine-executable instructions, wherein execution of the machine-executable instructions is for:
    receiving, over time, a sequence of input frames that comprise the signal;
    encoding a first frame of the sequence of input frames as an independently decodable frame and assigning the first frame as a current reference frame;
    encoding subsequently received input frames, in the sequence of input frames, each as a difference frame that represents a difference between the input frame and the current reference frame;

transmitting the independently decodable frame and each of the difference frames, after each is encoded, to a receiver;

receiving one or more acknowledgements from the receiver;

assigning an input frame corresponding to a difference frame associated with a received acknowledgment, of the one or more acknowledgements, as the current reference frame;

switching to a safe operating mode when one or more acknowledgements indicate that one of the independently decodable frame or the difference frames was unsuccessfully decoded; and switching to a normal operating mode when an abatement criterion is met;

where the one or more acknowledgements are received through an in-band or an out-of-band signaling.

16. The non-transitory machine readable medium of claim 15, where the signal includes a video stream.

17. The non-transitory machine readable medium of claim 15, where the received one or more acknowledgements includes one or more indicators each signifying an outcome of a decoding of an associated difference frame.

18. The non-transitory machine readable medium of claim 15, where the receiver decodes each difference frame using a frame previously decoded by the receiver that corresponds to the current reference frame from which the difference frame was derived without referencing any intervening frames in the sequence of frames between the current reference frame and the difference frame.

19. The non-transitory machine readable medium of claim 15, where each of the one or more acknowledgements is associated with one or more difference frames that are each marked as an acknowledgment-requested.

20. The non-transitory machine readable medium of claim 19, where each N difference frame is marked as the acknowledgment-requested before being transmitted and where N is a predetermined value.

21. The non-transitory machine readable medium of claim 19, where the acknowledgment-requested mark for each of the one or more difference frames is sent in-band using mechanisms including any of: in accordance with a video codec syntax being used for the encoding the input frames, in accordance with an ITU-T Supplementary Enhancement Information (SEI) message, and using a user data extension mechanism.

22. The non-transitory machine readable medium of claim 19, where the acknowledgment-requested mark for each of the one or more difference frames is sent out-of-band using mechanisms including any of: a Moving Picture Expert Group (MPEG) green MPEG set of metadata, an IETF RTCweb mechanism and an IETF Session Initiation Protocol (SIP) message.

23. The non-transitory machine readable medium of claim 15, where the independently decodable frame and each difference frame are encoded in accordance with an ITU-T Video Coding Experts Group H.264 standard.

24. The non-transitory machine readable medium of claim 15, where the one or more acknowledgements are received in-band using mechanisms in accordance with: a video codec syntax, a ITU-T Supplementary Enhancement Information (SEI) message, or a user data extension mechanism.

25. The non-transitory machine readable medium of claim 15, where the one or more acknowledgements are received out-of-band using mechanisms including any of: an IETF RTCweb mechanism, an IETF codec control message, an IETF AVPF message, a Moving Picture Expert Group (MPEG) green MPEG set of metadata, IETF codec control message and a IETF Session Initiation Protocol (SIP) message.

26. The non-transitory machine readable medium of claim 15, further comprising:

when in a safe mode, assigning an input frame corresponding to a difference frame associated with a received acknowledgment, of the one or more acknowledgements, as the current reference frame; and when in a normal mode, assigning an input frame as the current reference frame regardless of receiving an acknowledgement associated with a difference frame corresponding to the input frame.

27. The method for encoding a signal of claim 26, where the abatement criterion comprises receiving a positive indication of successful decoding of a predetermined number of successive independently decodable frame or the difference frames.

28. The non-transitory machine readable medium of claim 26, where the abatement criterion comprises a predetermined time duration of operation in the safe operating mode.

* * * * *

UNITED STATES PATENT AND TRADEMARK OFFICE
CERTIFICATE OF CORRECTION

Page 1 of 1

PATENT NO. : 9,774,869 B2
APPLICATION NO. : 13/849983
DATED : September 26, 2017
INVENTOR(S) : Christian Joseph Montminy et al.

It is certified that error appears in the above-identified patent and that said Letters Patent is hereby corrected as shown below:

On the Title Page

Left column, item (73), replace "Ontario Inc.," with --2236008 Ontario Inc.,--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*